(12) United States Patent
Kurokawa et al.

(10) Patent No.: US 10,179,375 B2
(45) Date of Patent: Jan. 15, 2019

(54) NC PROGRAM GENERATING DEVICE AND NC PROGRAM GENERATING METHOD

(71) Applicant: MITSUBISHI ELECTRIC CORPORATION, Tokyo (JP)

(72) Inventors: Hiroaki Kurokawa, Tokyo (JP); Toshiki Koshimae, Tokyo (JP); Yoshiyuki Ito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 517 days.

(21) Appl. No.: 14/787,786

(22) PCT Filed: Apr. 28, 2014

(86) PCT No.: PCT/JP2014/061852
§ 371 (c)(1),
(2) Date: Oct. 29, 2015

(87) PCT Pub. No.: WO2015/019668
PCT Pub. Date: Feb. 12, 2015

(65) Prior Publication Data
US 2016/0082545 A1     Mar. 24, 2016

(30) Foreign Application Priority Data

Aug. 7, 2013 (JP) .................................. 2013-164489

(51) Int. Cl.
*G06F 19/00*     (2018.01)
*B23K 26/04*     (2014.01)
(Continued)

(52) U.S. Cl.
CPC .............. *B23K 26/04* (2013.01); *B23K 26/00* (2013.01); *B23K 26/08* (2013.01); *B23Q 15/00* (2013.01);
(Continued)

(58) Field of Classification Search
CPC ........ B23K 26/04; B23K 26/00; B23K 26/08; G05B 19/4155; G05B 19/40937;
(Continued)

(56) References Cited

U.S. PATENT DOCUMENTS 4,870,560 A * 9/1989 Seki .................. G05B 19/4093
219/121.78
4,914,599 A * 4/1990 Seki ..................... G05B 19/408
219/121.82
(Continued)

FOREIGN PATENT DOCUMENTS

DE     199 00 140 A1   7/1999
EP     0 631 838 A1    1/1995
(Continued)

OTHER PUBLICATIONS

Communication dated Aug. 24, 2017 from the German Patent and Trademark Office in counterpart Application No. 11 2014 001 862.7.
(Continued)

*Primary Examiner* — Michael D Masinick
(74) *Attorney, Agent, or Firm* — Sughrue Mion, PLLC; Richard C. Turner

(57) ABSTRACT

Provided is an NC program generating device that generates an NC program used in laser machining, using a rapid traverse command that moves a relative position between a machining head and a workpiece at a first movement speed, and a linear interpolation movement command that moves the relative position at a second speed, while causing the relative position to trace the workpiece, the device comprising: a movement time calculation unit that calculates a first movement time of the relative position when using the rapid traverse command and a second movement time of the relative position when using the linear interpolation command, a movement method selection unit that selects the
(Continued)

movement command corresponding to the shorter time of the first movement time and the second movement time, and an NC program generating unit that generates an NC program by setting the selected movement command between the machining points.

11 Claims, 12 Drawing Sheets

(51) Int. Cl.
| | |
|---|---|
| *B23K 26/00* | (2014.01) |
| *B23K 26/08* | (2014.01) |
| *B23Q 15/00* | (2006.01) |
| *G05B 19/4093* | (2006.01) |
| *B23Q 15/013* | (2006.01) |
| *B23Q 15/10* | (2006.01) |
| *B23Q 15/14* | (2006.01) |
| *G05B 19/4155* | (2006.01) |

(52) U.S. Cl.
CPC ........... *B23Q 15/013* (2013.01); *B23Q 15/10* (2013.01); *B23Q 15/14* (2013.01); *G05B 19/40937* (2013.01); *G05B 19/4155* (2013.01); *G05B 2219/36284* (2013.01); *G05B 2219/45165* (2013.01); *Y02P 90/265* (2015.11)

(58) Field of Classification Search
CPC ........... G05B 2219/45165; G05B 2219/36284; B23Q 15/10; B23Q 15/013; B23Q 15/14; B23Q 15/00; Y02P 90/265
See application file for complete search history.

(56) References Cited

U.S. PATENT DOCUMENTS

| | | | |
|---|---|---|---|
| 5,466,909 A | 11/1995 | Nihei et al. | |
| 5,528,506 A | 6/1996 | Yoshida et al. | |
| 6,075,335 A * | 6/2000 | Momochi | G05B 19/4155 318/569 |
| 2008/0109097 A1 | 5/2008 | Takahashi et al. | |

FOREIGN PATENT DOCUMENTS

| | | | |
|---|---|---|---|
| EP | 1 895 375 A1 | 3/2008 | |
| JP | 6-43929 A | 2/1994 | |
| JP | 6-179092 A | 6/1994 | |
| JP | 8-118048 A | 5/1996 | |
| JP | 9-66377 A | 3/1997 | |
| JP | 9-108863 A | 4/1997 | |
| JP | 11-194806 A | 7/1999 | |
| JP | 2000-148222 A | 5/2000 | |
| JP | 2000-311010 A | 11/2000 | |
| JP | 2005-230975 A | 9/2005 | |
| JP | 2008-200712 A | 9/2008 | |
| JP | 2009-56488 A | 3/2009 | |
| JP | 2011-79016 A | 4/2011 | |
| WO | 94/13425 A1 | 6/1994 | |
| WO | 2006/137120 A1 | 12/2006 | |

OTHER PUBLICATIONS

International Search Report of PCT/JP2014/061852, dated Jul. 15, 2014. [PCT/ISA/210].
Written Opinion of PCT/JP2014/061852, dated Jul. 15, 2014. [PCT/ISA/237].

* cited by examiner

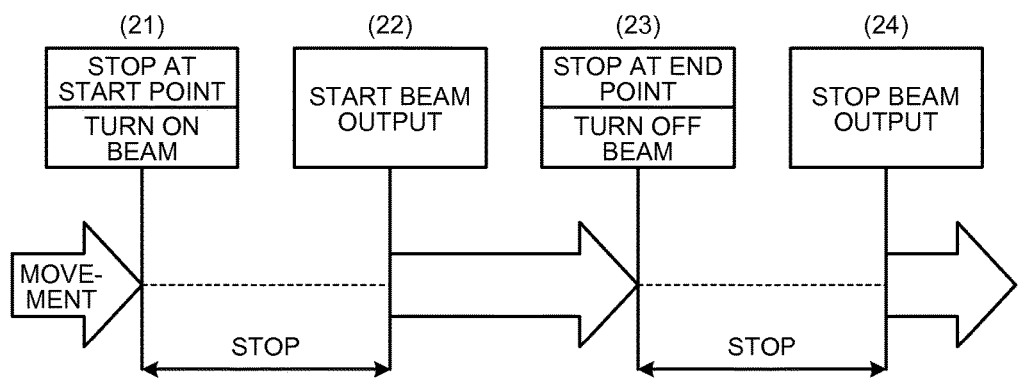
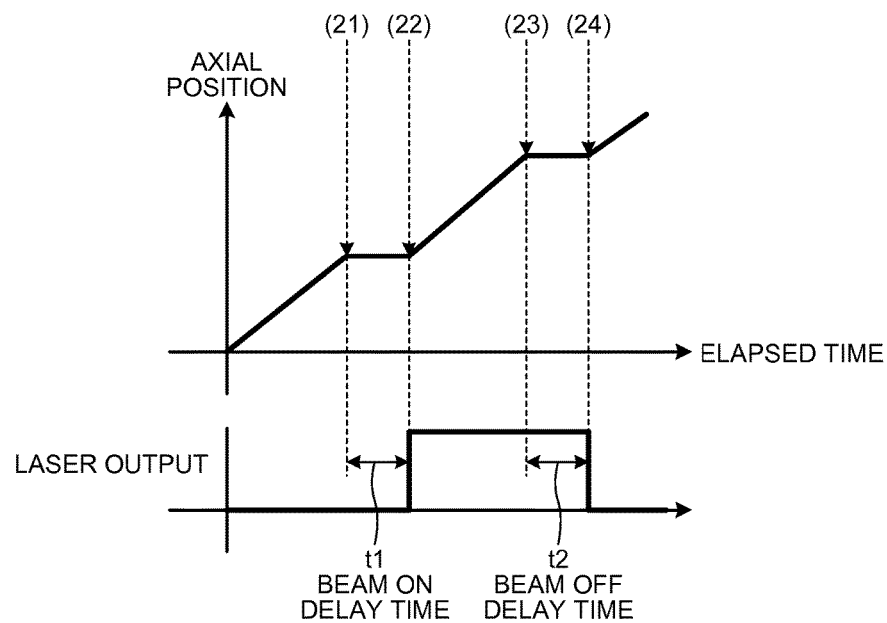

FIG.12

```
                       <SELECT G00/G01>                          51
1   G00X183.211Y168.524   (MOVE TO MACHINING START POINT)
2   **                    (READ MACHINING CONDITION)
3   **                    (TRACKING CONTROL ON)
4   **                    (BEAM ON)
5   G02I16.789J-18.524    (FIRST HOLE MACHINING)
6   **                    (BEAM OFF)
7   G01X206.723Y662.135   (MOVE TO START POINT OF SECOND HOLE MACHINING)
8   **                    BEAM ON
9   G03I-15.86J19.325     SECOND HOLE MACHINING
10  **                    BEAM OFF
11  **                   ☆ TRACKING CONTROL OFF
12  G00X1011.785Y677.952  MOVE TO START POINT OF THIRD HOLE MACHINING
13  **                   ☆ TRACKING CONTROL ON
14  **                    BEAM ON
15  G02I-11.785J22.048    THIRD HOLE MACHINING
16  **                    BEAM OFF
17  G01X1019.888Y170.979  MOVE TO START POINT OF FOURTH HOLE MACHINING
18  **                    BEAM ON
19  G02I-22.433J-11.034   FOURTH HOLE MACHINING
20  **                    BEAM OFF
21  **                    TRACKING CONTROL OFF
```

FIG.13

```
                                    <ONLY G01>
1    G00X182.322Y167.678       (MOVE TO MACHINING START POINT)
2    **                        (READ MACHINING CONDITION)
3    **                        (TRACKING CONTROL ON)
4    **                        (BEAM ON)
5    G02I17.678J-17.678        (FIRST HOLE MACHINING)
6    **                        (BEAM OFF)
7    G01X224.921Y697.183       (MOVE TO START POINT OF SECOND HOLE MACHINING)
8    **                        BEAM ON
9    G03I-25.J0.               SECOND HOLE MACHINING
10   **                        BEAM OFF
11   G02X250.025Y725.025I25.025J0.  MOVE TO START POINT OF THIRD HOLE MACHINING
12   G01X949.975Y725.025
13   G02X975.Y700.I0.J-25.025
14   **                        BEAM ON
15   G03I25.J0.                THIRD HOLE MACHINING
16   **                        BEAM OFF
17   G01X1017.461Y179.043      MOVE TO START POINT OF FOURTH HOLE MACHINING
18   **                        BEAM ON
19   G02I-22.433J-11.034       FOURTH HOLE MACHINING
20   **                        BEAM OFF
21   **                        TRACKING CONTROL OFF
```

NC PROGRAM GENERATING DEVICE AND NC PROGRAM GENERATING METHOD

CROSS REFERENCE TO RELATED APPLICATIONS

This application is a National Stage of International Application No. PCT/JP2014/061852 filed Apr. 28, 2014, claiming priority based on Japanese Patent Application No. 2013-164489, filed Aug. 7, 2013, the contents of all of which are incorporated herein by reference in their entirety.

FIELD

The present invention relates to an NC program generating device that generates an NC program, an NC program generating method, and an NC program generating program.

BACKGROUND

As laser machining, there are laser machining with shaft stop and laser machining without shaft stop. Conventionally, in the laser machining with shaft stop, when moving a machining head from a machining end point to the next machining start point, a rapid traverse (G00) has been performed after retracting the machining head from a workpiece to a predetermined height. Meanwhile, in the laser machining without shaft stop, a linear interpolation movement (G01) has been performed, while causing the machining head to always trace the workpiece.

A laser machining device described in Patent Literature 1 sequentially performs piercing at all piercing positions. Thereafter, the laser machining device sequentially performs cutting at all cutting positions. The laser machining device sequentially stores a tracing height (Z-shaft coordinate value) at a piercing start position of a machining nozzle. Moreover, when moving the machining head to the cutting start position, the laser machining device moves the machining head to the stored piercing start position at a rapid speed.

CITATION LIST

Patent Literature

Patent Literature 1: Japanese Patent Application Laid-Open No. 2011-79016

SUMMARY

Technical Problem

However, in the above-mentioned conventional technique, even when the movement distance of the machining head is short, the machining head is moved after retracting the machining head from the workpiece to a predetermined height. Therefore, machining may not be performed in the shortest time depending on the machining condition speed and the movement distance.

On the other hand, when always performing the linear interpolation movement in a tracing state, the machining head may fall down to the machined position to collide with a machining table, depending on the machining locus. The machining head may come into contact with an edge material after machining, resulting in producing a defective article. When performing all the movements by the linear interpolation movement, machining may not be performed in the shortest time depending on the machining condition speed and the movement distance.

The present invention has been made in view of the above problems, and an object thereof is to provide an NC program generating device, an NC program generating method, and an NC program generating program that can easily generate an NC program capable of performing the laser machining in a short time, while preventing machining defect.

Solution to Problem

In order to solve the aforementioned problems, an NC program generating device according to one aspect of the present invention that generates an NC program used in laser machining, using a rapid traverse command and a linear interpolation movement command, the rapid traverse command moving a relative position between a machining head and a workpiece at a first movement speed by separating a distance between the machining head and the workpiece to be greater than the distance during the laser machining, and the linear interpolation movement command moving the relative position at a second movement speed lower than the first movement speed, while causing the machining head to trace the workpiece is constructed to include: a movement time calculation unit that calculates a first movement time required when the relative position moves between machining points from a machining end point to the next machining start point in the case of using the rapid traverse command on the basis of a movement route of the machining head and the first movement speed when performing laser machining of the workpiece, and calculates a second movement time required when the relative position moves between the machining points in the case of using the linear interpolation command on the basis of the movement route and the second movement speed; a movement method selection unit that selects the movement command corresponding to the shorter one of the first movement time and the second movement time, as the movement command between the machining points; and an NC program generating unit that generates the NC program by setting the selected rapid traverse command or the linear interpolation movement command between the machining points.

Advantageous Effects of Invention

The present invention provides an effect of easily generating an NC program that can perform the laser machining in a short time, while preventing machining defect.

BRIEF DESCRIPTION OF DRAWINGS

FIG. 8 is a diagram for explaining the ON timing of the laser beam when performing the laser machining with the shaft stop.

FIG. 9 is a time chart illustrating the ON timing of the laser beam when performing the laser machining with shaft stop.

FIG. 12 is a diagram illustrating an example of an NC program when setting G00 and G01 between the machining points.

FIG. 13 is a diagram illustrating an example of an NC program when setting only G01 between the machining points.

DESCRIPTION OF EMBODIMENTS

Hereinafter, an NC program generating device, an NC program generating method and an NC program generating program according to exemplary embodiments of the present invention will be described in detail with reference to the drawings. The present invention is not limited by the embodiment. In the following description, the description will be given regarding the case of moving a relative position between the machining head and the workpiece by moving the machining head. However, the relative position between the machining head and the workpiece may be moved by moving the workpiece. Further, the relative position between the machining head and the workpiece may be moved by moving both the machining head and the workpiece. Therefore, the movement speed and the movement command described in the embodiment can be for the machining head and can be for the workpiece.

Embodiment

Figure 1:
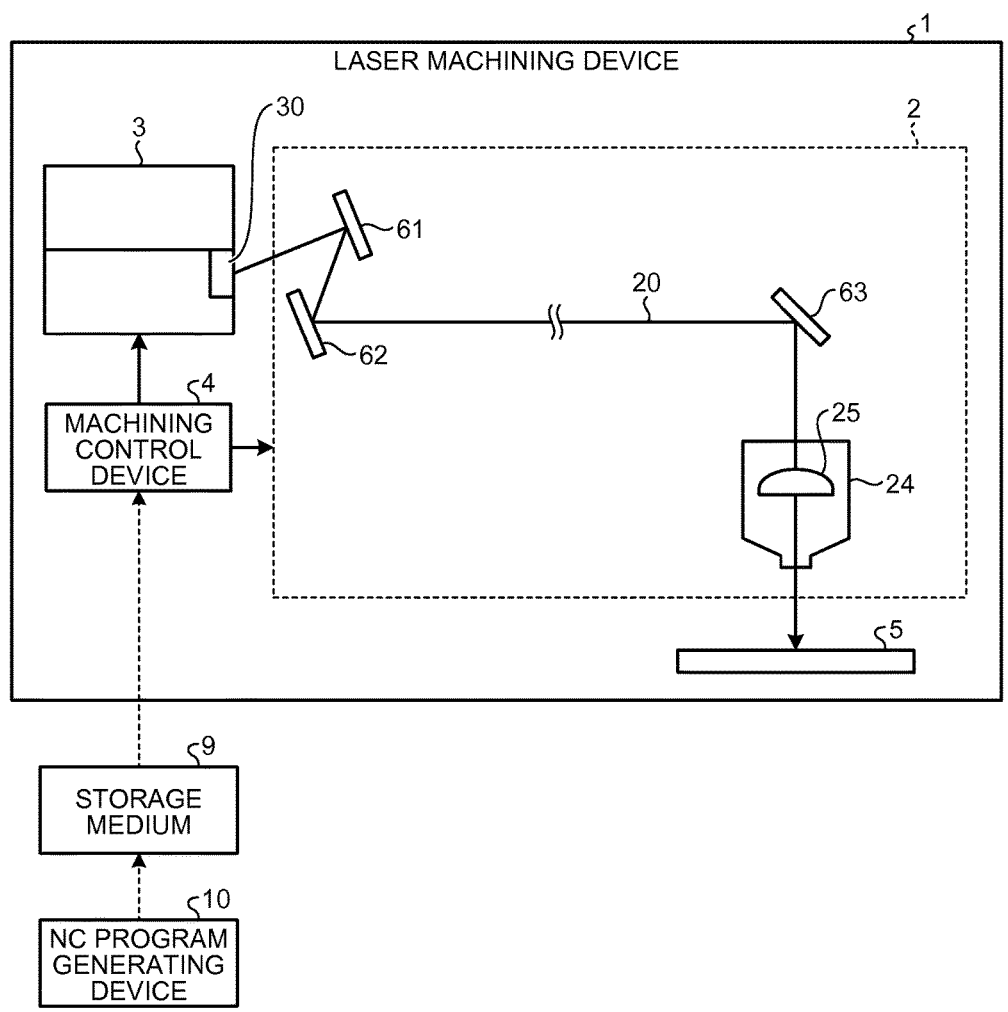
FIG. 1 is a diagram illustrating a configuration of a laser machining device according to an embodiment.

FIG. 1 is a diagram illustrating a configuration of a laser machining device according to an embodiment. A laser machining device 1 is a device that cuts a workpiece 5 (a plate-like member such as a sheet metal). The laser machining device 1 has a machining control device 4, a laser oscillator 3 and a laser beam irradiation unit 2.

The laser oscillator 3 is a device that oscillates a laser beam (beam light) 20 such as a $CO_2$ laser, a YAG laser, a fiber laser and a semiconductor laser, and emits the laser beam 20 to the laser beam irradiation unit 2. A PR mirror (partial reflection mirror) 30 is provided in the laser oscillator 3. The PR mirror 30 partially reflects the laser beam 20 emitted by the laser oscillator 3 and leads it to a bend mirror 61.

The laser beam irradiation unit 2 irradiates the workpiece (work) 5 with the laser beam 20 led from the laser oscillator 3. The laser beam irradiation unit 2 is provided with bend mirrors 61 to 63 and a machining head 24.

The bend mirrors 61 to 63 are mirrors that change a beam angle. The bend mirror 61 changes the beam angle of the laser beam 20 sent from the PR mirror 30 and leads it to the bend mirror 62. The bend mirror 62 deflects the beam angle of the laser beam 20 sent from the bend mirror 61 and sends it to the bend mirror 63. The bend mirror 63 changes the beam angle and the beam diameter of the laser beam 20 sent from the bend mirror 62 and sends it to the machining head 24.

The machining head 24 is provided with a machining lens 25. The machining lens 25 condenses the laser beam 20 sent from the bend mirror 63 to a small spot diameter and irradiates the workpiece 5 with the laser beam. The machining head 24 moves at a predetermined speed in accordance with an instruction from the machining control device 4.

The machining control device 4 controls the laser oscillator 3 and the laser beam irradiation unit 2. The machining control device 4, for example, has an NC (numerical control) device, and controls two-dimensional laser machining (piercing and cutting) through the laser beam irradiation unit 2 using the NC device.

The workpiece 5 is placed on a machining table (not illustrated) and is subjected to the laser machining on the machining table. The laser machining device 1 performs the laser machining of the workpiece 5 having a wide variety of materials and thicknesses as a target of the laser machining.

The NC program generating device 10 generates an NC program. The NC program generating device 10, for example, has a function of a CAM (Computer Aided Manufacturing) that generates an NC program (machining locus) using CAD (Computer Aided Design) data. The NC program generating device 10 sends the generated NC program to the machining control device 4 via a storage medium 9 (for example, a USB memory) or the like.

A machining route along which the laser machining is performed, and a non-machining route along which the movement of the machining head 24 is performed without performing the laser machining are set on the workpiece 5. On the machining route, a position at which the laser machining is started is a machining start point, and a position at which the laser machining is ended is a machining end point.

The NC program generating device 10 of the present embodiment sets the movement command to the machining head 24 between the machining points (non-machining route) from a machining end point to a next machining start point. The NC program generating device 10 selects either a rapid traverse command (G00) or a linear interpolation movement command (G01) between the machining points, on the basis of the machining conditions and the movement route (machining route). The NC program generating device 10 selects either one of the rapid traverse command (G00) and the linear interpolation movement command (G01) for each movement command to the machining head 24, and sets the selected command in the NC program.

The NC program generating device 10, for example, selects either G00 or G01, on the basis of the plate thickness of the workpiece 5, the type of the material, the machining shape (movement route), the movement speed of the machining head 24 set in G01, the acceleration of the machining head 24 set in G01, the movement speed of the machining head 24 set in G00, the acceleration of the machining head 24 set in G00, or the like.

Figure 2:
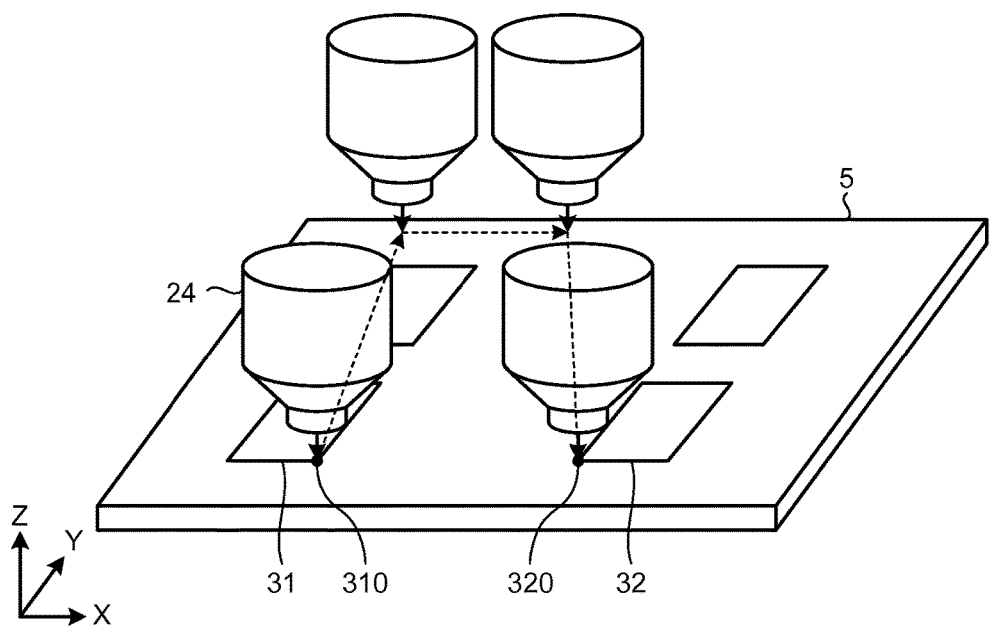
FIG. 2 is a diagram for explaining a movement route of a rapid traverse command.
Figure 3:
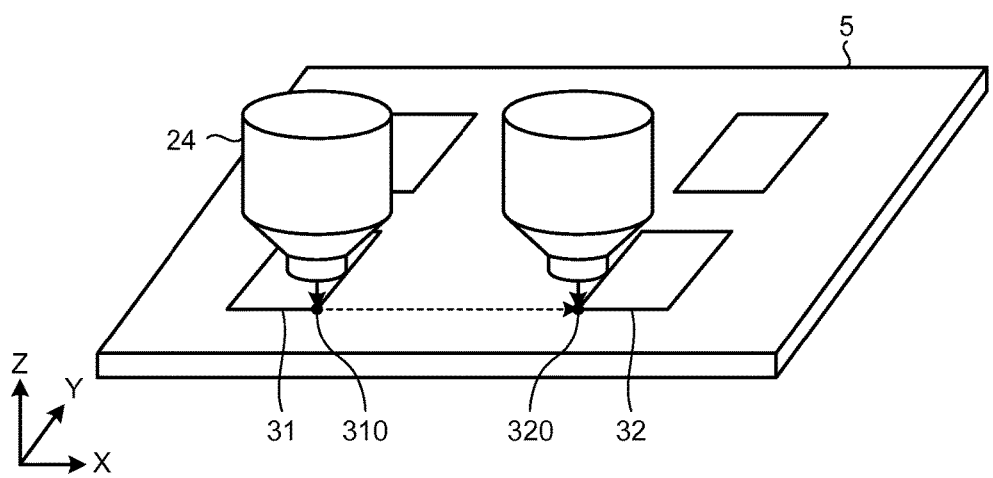
FIG. 3 is a diagram for explaining a movement route of a linear interpolation movement command.

Here, the rapid traverse command (G00) and the linear interpolation movement command (G01) will be described. FIG. 2 is a diagram for explaining a movement route of the rapid traverse command, and FIG. 3 is a diagram for explaining a movement route of the linear interpolation movement command.

Each of the rapid traverse command (G00) and the linear interpolation movement command (G01) is a movement command for the machining head 24. G00 is a command for moving the machining head 24 at the maximum speed (first movement speed) of the laser machining device 1.

When moving the machining head 24 in G00, it is performed in a state in which the machining head 24 has been raised to a position (Z-shaft coordinates) higher than a predetermined value (retraction height). For example, when moving the machining head 24 in G00, a distance between the machining head 24 and the workpiece 5 is separated to be larger than the distance at the time in which laser machining is being performed, and the machining head 24 is moved at a first movement speed. In this way, G00 is a command that separates the distance between the machining head 24 and the workpiece 5 to be larger than a predetermined distance and moves the machining head 24 at a maximum speed.

Therefore, when G00 is used, the machining head 24 moves from a machining end point 310 on a first machining position 31 to a machining start point 320 on a second machining position 32, by a high-speed movement corresponding to G00. When G00 is used, the piercing and cutting are performed, while stopping the machining shaft of the machining head 24.

G01 is a command for moving the machining head 24 at a speed that is set in the machining conditions. When moving the machining head 24 in G01, while adjusting the height of the machining head 24 such that the distance between the machining head 24 and the workpiece 5 becomes shorter than the case of the rapid traverse command, the movement of the machining head 24 is performed at a second movement speed lower than the first movement speed. In other words, when moving the machining head 24 in G01, the linear interpolation movement is performed, while causing the machining head 24 to always trace the workpiece 5. Specifically, when moving the machining head 24 in G01, the movement of the machining head 24 is performed, while causing the machining head 24 to trace the workpiece 5 at the same height as that in the case of machining. As such, G01 is a command for moving the machining head 24 at the movement speed in accordance with the machining conditions, while causing the machining head 24 to trace the workpiece 5.

Therefore, when G01 is used, the machining head 24 moves from the machining end point 310 to the machining start point 320, while performing the tracing operation corresponding to G01. When G01 is used, piercing and cutting are performed without stopping the machining shaft of the machining head 24. As such, when G01 is used, a method of performing the piercing without stopping the machining head 24 (running pierce) is used.

From the machining end point 310 to the machining start point 320 on the workpiece 5, the machining head 24 is moved with the laser beam 20 being in an OFF state. In this case, the height of the machining head 24 in G01 can be lower than the case of G00. Meanwhile, the speed of the machining head 24 in G00 is faster than the case of G01.

Figure 4:
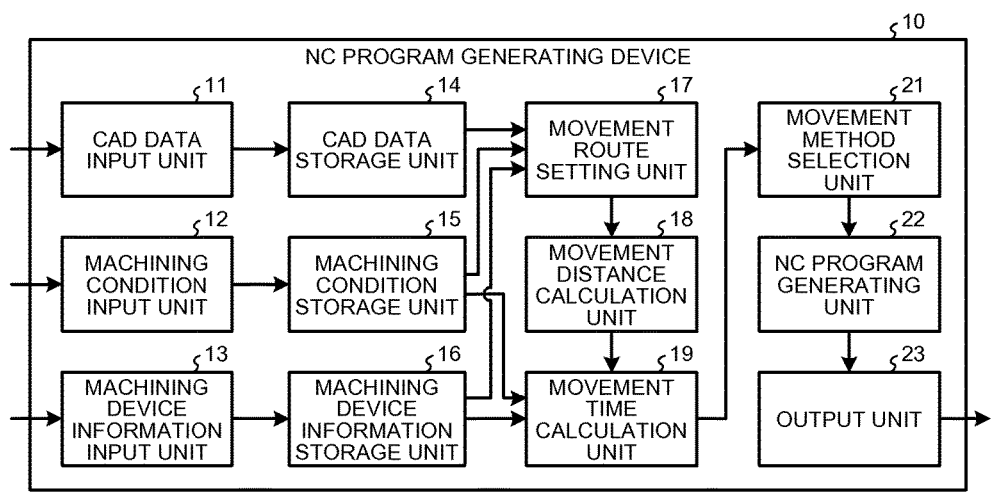
FIG. 4 is a block diagram illustrating a configuration of an NC program generating device according to an embodiment.

Next, the configuration of the NC program generating device 10 will be described. FIG. 4 is a block diagram illustrating the configuration of the NC program generating device according to an embodiment. The NC program generating device 10 has a CAD data input unit 11, a machining condition input unit 12, a machining device information input unit 13, a CAD data storage unit 14, a machining condition storage unit 15, a machining device information storage unit 16, a movement route setting unit 17, a movement distance calculation unit 18, a movement time calculation unit 19, a movement method selection unit 21, an NC program generating unit 22 and an output unit 23.

The CAD data input unit 11 inputs CAD data (drawing data) and sends it to the CAD data storage unit 14. The CAD data is data that represents a shape (product shape) (target machining shape) of the workpiece 5 after the laser machining. The CAD data is input to the CAD data input unit 11 from a CAD data generating device or the like.

The machining condition input unit 12 inputs machining conditions when performing the laser machining of the workpiece 5, and sends them to the machining condition storage unit 15. The machining conditions include the plate thickness of the workpiece 5, the material of the workpiece 5, the movement speed (machining command speed) of the machining head 24 set in G01, the acceleration (productivity) set in G01, or the like. The machining conditions are input to the machining condition input unit 12, by a user of the NC program generating device 10.

The machining device information input unit 13 inputs information about the laser machining device 1, and sends it to the machining device information storage unit 16. The machining device information includes the movement speed of the machining head 24 set in G00, the acceleration (productivity) set in G00 and the like. The machining device information is input to the machining device information input unit 13, by the user of the NC program generating device 10 or the like. The machining device information is information unique to the laser machining device 1. Meanwhile, the machining conditions are set for each machining process.

The CAD data storage unit 14 is a memory that stores the CAD data. The machining condition storage unit 15 is a memory that stores the machining conditions. The machining device information storage unit 16 is a memory that stores the machining device information.

The movement route setting unit 17 is connected to the CAD data storage unit 14, the machining condition storage unit 15 and the machining device information storage unit 16. The movement route setting unit 17 sets the movement route of the machining head 24 on the basis of the CAD data, when performing the laser machining of the workpiece 5. The movement route setting unit 17 sets the movement route of the machining head 24 so that the movement route in the X-Y plane of the machining head 24 becomes the shortest. The movement route setting unit 17 sends the set movement route to the movement distance calculation unit 18.

The movement distance calculation unit 18 calculates the movement distance on the basis of the movement route. The movement distance calculation unit 18 calculates the movement distance of the machining head 24 from the machining end point 310 to the machining start point 320 (between the machining points) between each of the machining points. The movement distance calculation unit 18 sends the movement distance between each of the machining points to the movement time calculation unit 19.

The movement time calculation unit 19 is connected to the machining condition storage unit 15, the machining device information storage unit 16 and the movement distance calculation unit 18. The movement time calculation unit 19 calculates the movement time of the machining head 24 between each of the machining points, on the basis of the movement distance between individual machining points and the movement speed of the machining head 24. The movement time calculation unit 19 of this embodiment calculates both the movement time required when G00 is used and the movement time required when G01 is used.

The movement time calculation unit 19 calculates the movement time (hereinafter, referred to as "maximum-speed movement time") required when G00 is used, on the basis of the machining device information and the movement distance between individual machining points. The movement time calculation unit 19 calculates the movement time (hereinafter, referred to as "command-speed movement time") required when G01 is used, on the basis of the machining conditions and the movement distance between individual machining points. The movement time calculation unit 19 sends the calculated movement time to the movement method selection unit 21.

The movement method selection unit 21 compares the maximum-speed movement time with the command-speed movement time. The movement method selection unit 21 determines as to which of the maximum-speed movement time and the command-speed movement time is shorter between individual machining points.

The movement method selection unit 21 selects the movement command (movement method) with shorter movement time, out of the maximum-speed movement time and the command-speed movement time. As long as there is a relation of the maximum-speed movement time the command-speed movement time, the movement method selection unit 21, for example, selects G00 corresponding to the maximum-speed movement time. Meanwhile, as long as there is a relation of the maximum-speed movement time>the command-speed movement time, the movement method selection unit 21, for example, selects G01 corresponding to the command-speed movement time.

When there is a relation of 'the maximum-speed movement time=the command-speed movement time', the movement method selection unit 21 may select any one of G00 and G01 as the movement method. The movement method selection unit 21 associates the selected movement method (G00 or G01) with each machining point, and sends the associated information (movement method at each machining point) to the NC program generating unit 22.

The NC program generating unit 22 generates an NC program using the movement method of each machining point. The NC program generating unit 22 sends the generated NC program to the output unit 23. The output unit 23 outputs the NC program to the laser machining device 1 or the like.

Figure 5:
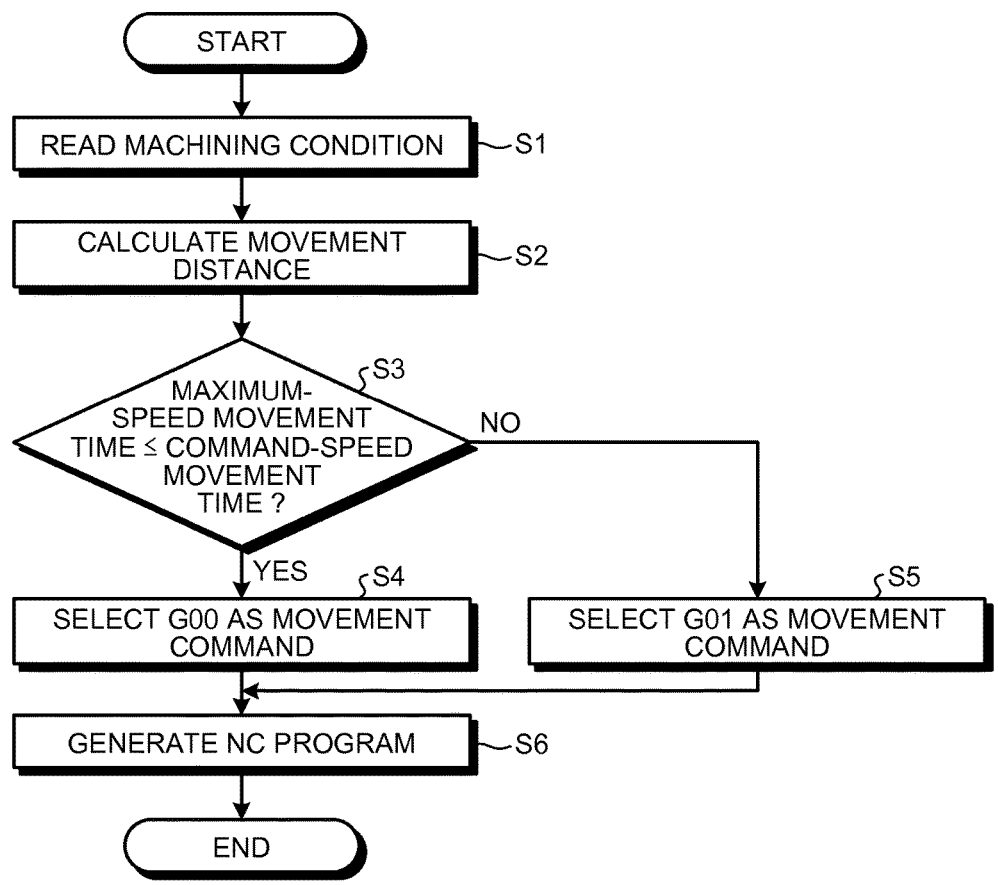
FIG. 5 is a flowchart for explaining a generating procedure of the NC program.

Next, the generation procedure of the NC program will be described. FIG. 5 is a flowchart illustrating the generation procedure of the NC program. The machining device information is set to the machining device information input unit 13 of the NC program generating device 10 in advance. The machining device information is stored in the machining device information storage unit 16.

The CAD data is input to the CAD data input unit 11 from the CAD data generating device or the like. The CAD data is stored in the CAD data storage unit 14. The machining conditions are input to the machining condition input unit 12, by the user of the NC program generating device 10 or the like. The machining conditions are stored in the machining condition storage unit 15.

The movement route setting unit 17 reads the CAD data from the CAD data storage unit 14. Further, the movement route setting unit 17 reads the machining conditions from the machining condition storage unit 15 (step S1). Further, the movement route setting unit 17 reads the machining device information from the machining device information storage unit 16. The movement route setting unit 17 sets the movement route in the X-Y plane of the machining head 24 when performing the laser machining of the workpiece 5, on the basis of the CAD data, the machining conditions and the machining device information.

In this embodiment, the movement method (movement command) is selected by either the following selection process (1) or selection process (2). In the selection process (1), the movement time of the machining head 24 when G00 is used and the movement time of the machining head 24 when G01 is used are calculated, and the movement command of the shorter movement time is selected (G00 or G01).

Meanwhile, in the selection process (2), when the movement route enters a certain area (hereinafter, referred to as machined area) that includes the machined part between the machining end point 310 and the machining start point 320, G00 is selected. In the selection process (2), as long as the movement route does not enter the machined area, the movement command is selected in the same manner as the selection process (1). Hereinafter, after describing the processing procedure of the selection process (1), the processing procedure of the selection process (2) will be described.

Selection Process (1)

The movement route setting unit 17 calculates the movement route when G00 is used, and the movement route when G01 is used. When calculating the movement route in the case of using G00, the movement route setting unit 17 calculates the movement route such that the movement route becomes the shortest in the X-Y plane, on the basis of the machining shape of the workpiece 5.

Further, when calculating the movement route using G00, the movement route setting unit 17 sets the movement route, on the basis of at least one of the plate thickness of the workpiece 5, the material of the workpiece 5, the movement speed of the machining head 24 set in G00 and the acceleration of the machining head 24 set in G00, and the machining shape of the workpiece 5.

When calculating the movement route in the case of using G01, the movement route setting unit 17 calculates the movement route such that the movement route becomes the shortest in the X-Y plane on the basis of the machining shape of the workpiece 5. In this case, when the movement route enters the machined area, the movement route setting unit 17 calculates the movement route such that the movement route becomes the shortest in the X-Y plane, while avoiding the machined area.

When calculating the movement route using G01, the movement route setting unit 17 sets the movement route, on the basis of at least one of the plate thickness of the workpiece 5, the material of the workpiece 5, the movement speed of the machining head 24 set in G01 and the acceleration of the machining head 24 set in G01, and the machining shape of the workpiece 5.

In the machining device information, the shaft stop or the axial nonstop is set as the initial setting of the laser machining device 1. When the shaft stop is set in the machining device information, the movement route setting unit 17, for example, selects the movement method by the selection process (1). Further, when the axial nonstop is set in the machining device information, the movement route setting unit 17, for example, selects the movement method by the selection process (2). Further, the movement route setting unit 17 may use any of the selection processes (1) and (2), whether or not with shaft stop or without shaft stop.

The movement distance calculation unit 18 calculates the movement distance of the machining head 24 between each of machining points, on the basis of the movement route when G00 is used. The movement distance calculation unit 18 calculates the movement distance of the machining head 24 between each of machining points on the basis of the movement route when G01 is used (step S2). The movement distance calculation unit 18 sends the movement distance between each of the machining points to the movement time calculation unit 19.

The movement time calculation unit 19 calculates the movement time of the machining head 24 between each of the machining points, on the basis of the movement distance between each of the machining points and the movement speed of the machining head 24. The movement time calculation unit 19 calculates the maximum-speed movement time required when G00 is used for each of the machining points, on the basis of the movement route when G00 is used. Further, the movement time calculation unit 19 calculates the command-speed movement time required when G01 is used for each of the machining points, on the basis of the movement route when G01 is used. The movement time calculation unit 19 sends the calculated maximum-speed movement time and the command-speed movement time to the movement method selection unit 21.

The movement method selection unit 21 compares the maximum-speed movement time with the command-speed movement time. The movement method selection unit 21 determines as to which of the maximum-speed movement time and the command-speed movement time is shorter for each machining point (step S3). In other words, the movement method selection unit 21 determines as to which of the G00 and G01 should be selected to enable the laser machining to be performed in a shorter period.

As long as the relation of the maximum-speed movement time≤the command-speed movement time is satisfied (step S3, Yes), the movement method selection unit 21 selects G00 corresponding to the maximum-speed movement time as a movement command (step S4). Meanwhile, as long as there is a relation of the maximum-speed movement time>the command-speed movement time (step S3, No), the movement method selection unit 21 selects G01 corresponding to the command-speed movement time as a movement command (step S5).

The movement method selection unit 21 associates the selected movement method (G00 or G01) with each machining point, and sends the associated information to the NC program generating unit 22. The NC program generating unit 22 generates the NC program using the movement method between each of the machining points (step S6).

Selection Process (2)

The movement route setting unit 17 calculates the movement route (shortest route) when G00 is used. When calculating the movement route in the case of using G00, the movement route setting unit 17 calculates the movement route such that the movement route becomes the shortest in the X-Y plane, according to the machining shape of the workpiece 5.

When calculating the movement route using G00, the movement route setting unit 17 can set the movement route, on the basis of at least one of the plate thickness of the workpiece 5, the material of the workpiece 5, the movement speed of the machining head 24 set in G00 and the acceleration of the machining head 24 set in G00, and the machining shape of the workpiece 5.

The movement route setting unit 17 sends the movement route (between the machining points), which enters the machined area, to the movement method selection unit 21 via the movement distance calculation unit 18 and the movement time calculation unit 19. The movement method selection unit 21 selects G00 for the movement route that enters the machined area.

Meanwhile, the movement route setting unit 17 calculates the movement route when G01 is used in the movement route which does not enter the machined area. Thereafter, G00 or G01 is selected by the same method as above-described selection process (1) in the movement route that does not enter the machined area. In addition, when the movement route in the case of using G01 enters the machined area, the movement method selection unit 21 selects G00 for the movement route.

In the NC program, G00 or G01 is set between each of the machining points by the selection process (1) or the selection process (2). The NC program generating unit 22 sends the generated NC program to the output unit 23. The output unit 23 outputs the NC program to the laser machining device 1 or the like.

Figure 6:
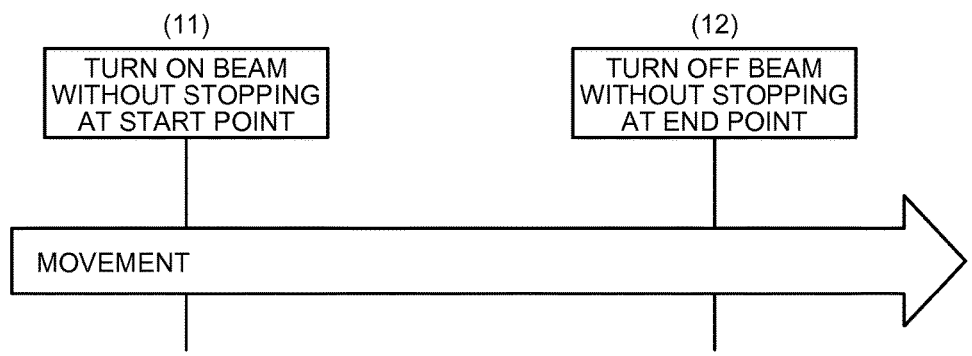
FIG. 6 is a diagram illustrating an ON timing of the laser beam when performing the laser machining without shaft stop.
Figure 7:
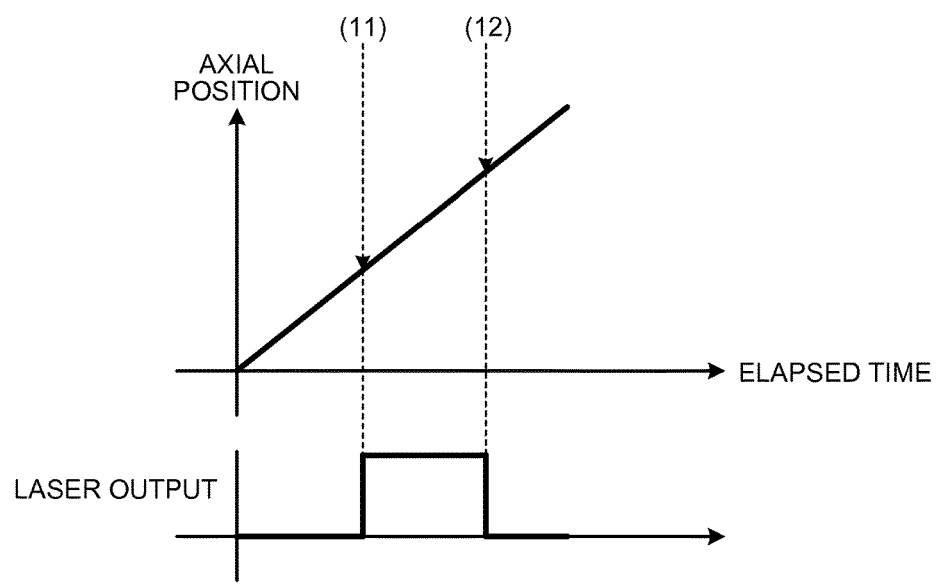
FIG. 7 is a time chart illustrating the ON timing of the laser beam when performing the laser machining without the shaft stop.

FIG. 6 is a diagram for explaining the ON timing of the laser beam when performing the laser machining without the shaft stop, and FIG. 7 is a time chart illustrating the ON timing of the laser beam when performing the laser machining without the shaft stop.

When performing the laser machining without the shaft stop (G01), the machining head 24 is moved up to the machining start point. Further, the laser machining device 1 turns on the beam of the laser beam 20 without stopping the machining head 24 at the machining start point (11). Thus, the beam output is started at the machining start point of the laser machining position. By moving the machining head 24 while starting the beam output, the workpiece 5 is subjected to laser machining.

Thereafter, the machining head 24 is moved up to the end point of the laser machining. Moreover, the laser machining device 1 turns off the beam of the laser beam 20 without stopping the machining head 24 at the machining end point (12). Thus, the beam output is stopped at the end point of the laser machining position.

In other words, when performing the laser machining without the shaft stop, the laser machining device 1 turns on the beam, while axially moving the machining head 24. Thus, hole machining (circle machining) into the workpiece 5 is instantaneously performed, and the movement and cutting are performed as it is. Thereafter, the laser machining device 1 turns off the beam of the laser beam 20, while moving the machining head 24. Thus, the laser machining device 1 synchronizes the movement of the shaft and the beam ON/OFF timing, while moving the machining head 24 in a stepless manner. As a result, the stop time (waiting time) of the machining head 24 is eliminated.

FIG. 8 is a diagram for explaining the ON timing of the laser beam when performing the laser machining with the shaft stop, and FIG. 9 is a time chart illustrating the ON timing of the laser beam when performing the laser machining with the shaft stop.

When performing the laser machining with the shaft stop (G00), the machining head 24 is moved up to the machining start point and is stopped at the machining start point. The laser machining device 1 then turns on the beam of the laser beam 20 (21). Thus, the beam output is started at the machining start point of the laser machining position (22). After the beam output is started, the machining head 24 is moved to perform the laser machining of the workpiece 5.

Thereafter, the machining head 24 is moved up to the end point of the laser machining and is stopped at the end point of the laser machining. Moreover, the laser machining device 1 turns off the beam of the laser beam 20 (23). Thus, the beam output is stopped at the end point of the laser machining position (24). Thereafter, the machining head 24 is moved to the next machining point.

In other words, when performing the laser machining with the shaft stop, after the machining head 24 is axially moved (moved in the X-Y plane of the machining head 24), the machining head 24 is axially stopped, and after the beam is reliably turned on, the axial movement is resumed. Moreover, after cutting of the workpiece 5, the machining head 24 is axially stopped, and after the beam is reliably turned off, the axial movement is resumed.

When performing the laser machining with the shaft stop, a period between the beam ON (21) and the beam output start (22) becomes a beam ON delay time t1. Moreover, a period between the beam OFF (23) and the beam output stop (24) becomes a beam OFF delay time t2. In this way, when performing the laser machining with the shaft stop, in the delay time period of the beam ON and OFF, the shaft stop is completely performed.

Figure 10:
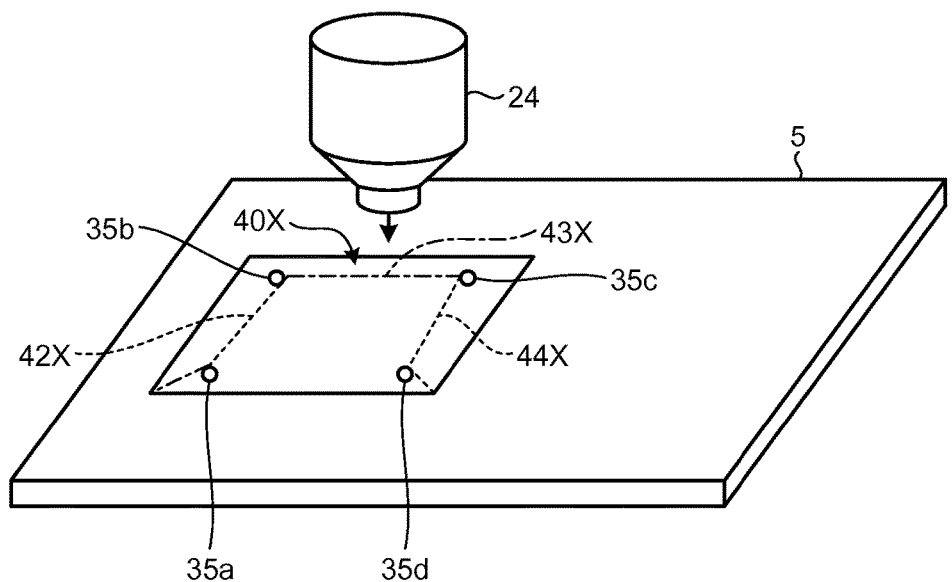
FIG. 10 is a diagram illustrating an example of a movement route and a movement command when setting G00 and G01 between the machining points.
Figure 11:
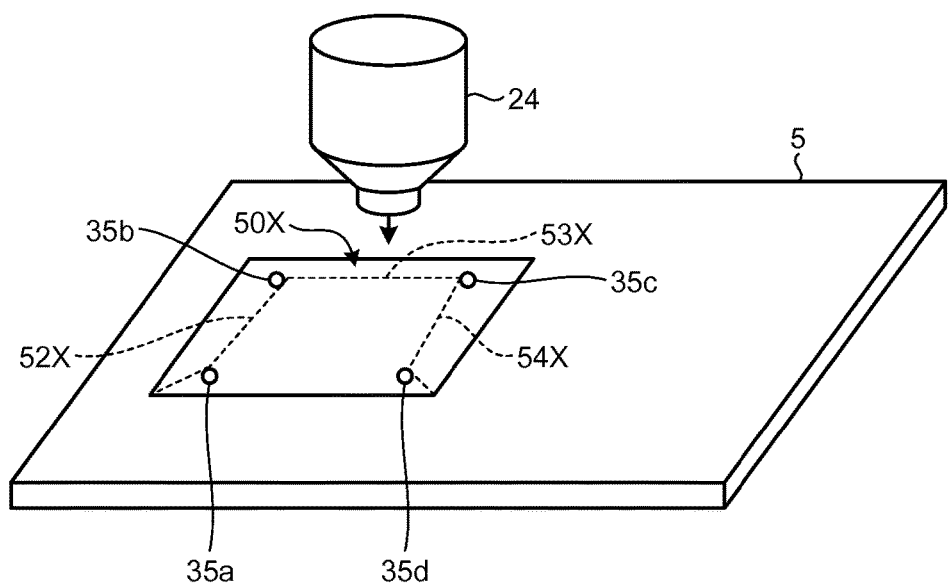
FIG. 11 is a diagram illustrating an example of a movement route and a movement command when setting only G01 between the machining points.

FIG. 10 is a diagram illustrating an example of the movement route and the movement command when G00 and G01 are set between the machining points. FIG. 11 is a diagram illustrating an example of the movement route and the movement command when only G01 is set between the machining points.

FIGS. 10 and 11 illustrate the movement route and the movement command when performing the laser machining of only one piece with four holes. Specifically, FIGS. 10 and 11 illustrate the movement route when a first hole 35*a* to a fourth hole 35*d* of φ50 are formed at four locations in a plate-like member having a shape of 1000 mm×750 mm after machining the workpiece 5.

As illustrated in FIG. 10, in the movement route 40X when G00 and G01 are used, for example, G01 is set in a first inter-point route 42X, G00 is set in a second inter-point route 43X, and G01 is set in a third inter-point route 44X.

Moreover, the machining head 24 is moved in the order of the first hole 35*a*, the first inter-point route 42X, the second hole 35*b*, the second inter-point route 43X, the third hole 35*c*, the third inter-point route 44X and the fourth hole 35*d*.

As illustrated in FIG. 11, in the movement route 50X when performing the laser machining using only G01, for example, G01 (without shaft stop) is set in each of the first inter-point route 52X to the third inter-point route 54X.

Further, the machining head 24 is moved in the order of the first hole 35*a*, the first inter-point route 52X, the second hole 35*b*, the second inter-point route 53X, the third hole 35*c*, the third inter-point route 54X and the fourth hole 35*d*.

In addition, the laser machining may be performed without the shaft stop (G01) from the initial position of the machining head 24 to the machining start point of the first hole 35*a*, and the laser machining may be performed with the shaft stop (G00). In this embodiment, the axial nonstop or the shaft stop is set in the inter-point route.

FIG. 12 is a diagram illustrating an example of a NC program when G00 and G01 are set between the machining points. FIG. 13 is a diagram illustrating an example of an NC program when only G01 is set between the machining points. An NC program 51 illustrated in FIG. 12 is an NC program in the case of performing the laser machining using the movement route 40X illustrated in FIG. 10. An NC program 52 illustrated in FIG. 13 is an NC program in the case of performing the laser machining using the movement route 50X illustrated in FIG. 11.

Accordingly, the NC programs 51 and 52 are programs for performing a series of machining processes (nesting machining processes) on one component subjected to the hole machining of machining 1 to machining 4 (first hole 35*a* to fourth hole 35*d*). In addition, in the NC programs 51 and 52 illustrated in FIGS. 12 and 13, the outer periphery machining of the components is omitted.

Here, the series of machining processes, for example, refer to "machining 1 start" to "machining 4 end" among {"machining 1 start" to "machining 1 end"}→(movement) →{"machining 2 start" to "machining 2 end"}→(movement)→{"machining 3 start" to "machining 3 end"}→ (movement)→{"machining 4 start" to "machining 4 end"}. Here, {"machining 1 start" to "machining 1 end"} is the first hole machining, and {"machining 2 start" to "machining 2 end"} is the second hole machining. Similarly, {"machining 3 start" to "machining 3 end"} is the third hole machining, and {"machining 4 start" to "machining 4 end"} is the fourth hole machining. In this embodiment, G00 and G01 are set in the "movement" in a series of machining processes.

In the case of the NC program 51 illustrated in FIG. 12 (G00/G01 is selected), the laser machining device 1 executes G00 (rapid traverse command) when the machining head 24 is moved to the start point of the third hole machining. Also, the laser machining device 1 executes G01 (linear interpolation movement command), when the machining head 24 is moved to the start points of the second and fourth hole machining.

Specifically, the laser machining device 1 turns on the tracing control by the command of the third row. Thereafter, the laser machining device 1 executes G01 (linear interpolation movement command) by the command of the seventh row. Thus, the laser machining device 1 performs the linear interpolation movement of the machining head 24 to the start point of the second hole machining.

Further, the laser machining device 1 turns on the beam of the laser beam 20 by the command of the eighth row, performs the second hole machining (circle machining) by the command of the ninth row, and turns off the beam of the laser beam 20 by the command of the tenth row.

The laser machining device 1 turns off the tracing control by the command of the eleventh row. Thereafter, the laser machining device 1 executes G00 (rapid traverse command) by the command of the twelfth row. Thus, the laser machining device 1 performs the rapid traverse of the machining head 24 to the start point of the third hole machining.

Furthermore, the laser machining device 1 turns on the tracing control by the command of the thirteenth row. Thereafter, the laser machining device 1 turns on the beam of the laser beam 20 by the command of the fourteenth row, performs the third hole machining by the command of the fifteenth row, and turns off the beam of the laser beam 20 by the command of the sixteenth row.

In the case of the NC program 52 (only G01) illustrated in FIG. 13, when the machining head 24 is moved to the start points of each of the second to fourth hole machining, the laser machining device 1 executes G01 (linear interpolation movement command). Specifically, the laser machining device 1 turns on the tracing control by the command of the third row. Thereafter, the laser machining device 1 performs the second to fourth hole machining, without turning off the tracing control. Moreover, the laser machining device 1 turns off the tracing control by the command of the twenty-first row.

FIGS. 12 and 13 illustrate the case of performing a series of machining processes on one component, but there is a case where a plurality of component machinings are performed on the workpiece 5. In this case, the NC program generating device 10 generates the NC program for performing a plurality of component machining from a single workpiece 5. In other words, the NC program generating device 10 generates an NC program for performing a plurality of component machinings as a series of machining processes.

Figure 14:
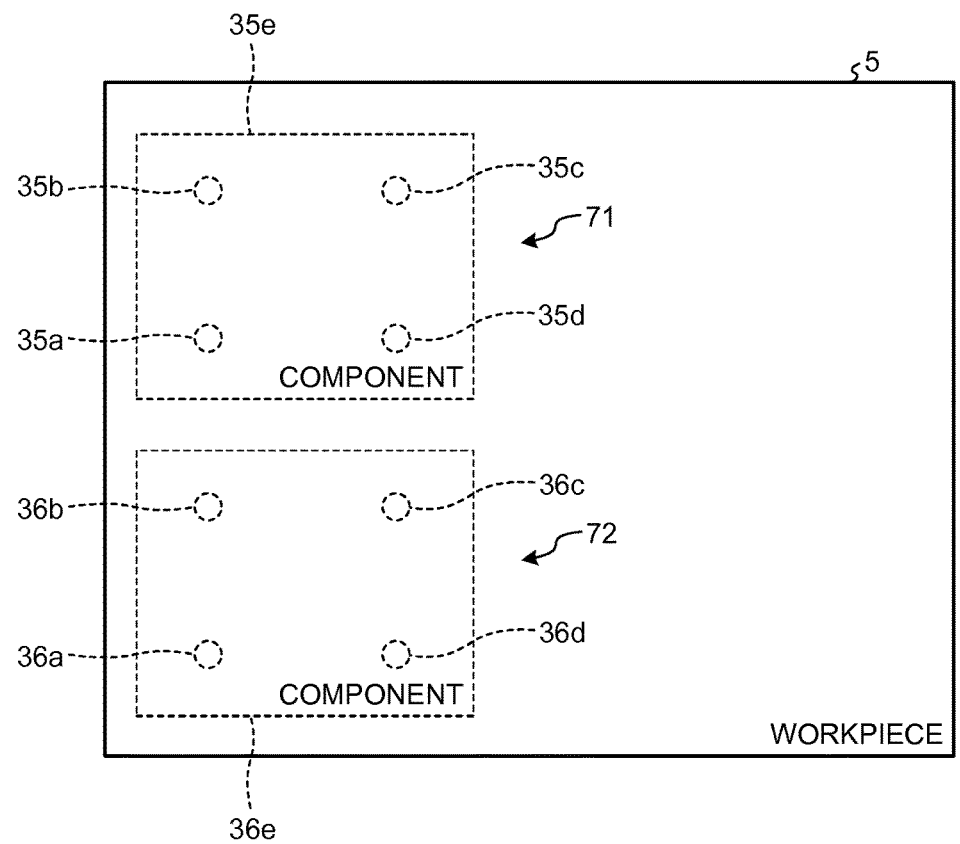
FIG. 14 is a diagram illustrating a configuration of a workpiece when a plurality of components is subjected to laser machining.

FIG. 14 is a diagram illustrating a configuration of a workpiece when the plurality of components is subjected to laser machining. Here, the description will be given of a case where components 71 and 72 are formed from the workpiece 5 by performing the laser machining of the workpiece 5.

For example, the component 71 is formed by performing the machining of the first hole 35a to the fourth hole 35d and the outer periphery machining 35e on the workpiece 5. Moreover, the component 72 is formed by performing the machining of the fifth hole 36a to the eighth hole 36d and the outer periphery machining 36e on the workpiece 5.

In this case, the NC program generating device 10, for example, generates an NC program in which the machining of the first hole 35a to the fourth hole 35d, the outer periphery machining 35e, the machining of the fifth hole 36a to the eighth hole 36d and the outer periphery machining 36e are performed in this order. At this time, the NC program generating device 10 sets G00 or G01 in the movement route from each machining position to the next machining position. In the NC program thus generated, the machining of the component 71 is single article machining and the machining of the component 72 is single article machining. Therefore, the NC program is a program for executing a series of machining processes (nesting machining processes) of the components 71 and 72.

Meanwhile, the movement route in the X-Y plane of the machining head 24 may vary depending on the plate thickness of the workpiece 5. Also, as to which one of G00 and G01 the NC program generating device 10 should select may vary depending on the plate thickness of the workpiece 5. This is because the movement speed in accordance with the plate thickness may be set in G00 and G01. Next, a relation between the plate thickness of the workpiece 5 and the movement route of the machining head 24 will be described.

Figure 15:
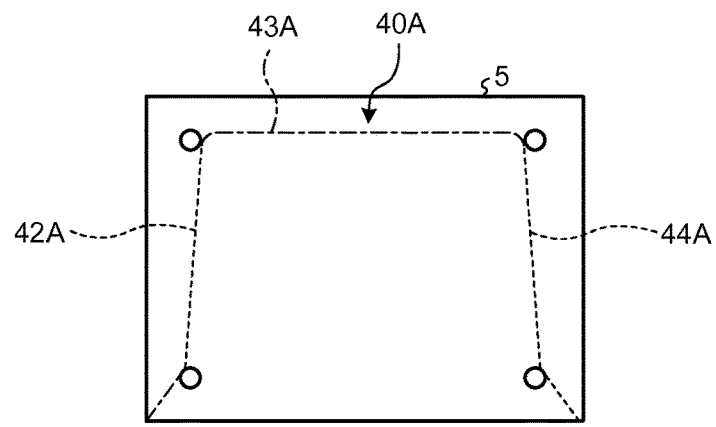
FIG. 15 is a diagram illustrating a movement route and a movement command that are set in a workpiece having a first plate thickness.
Figure 16:
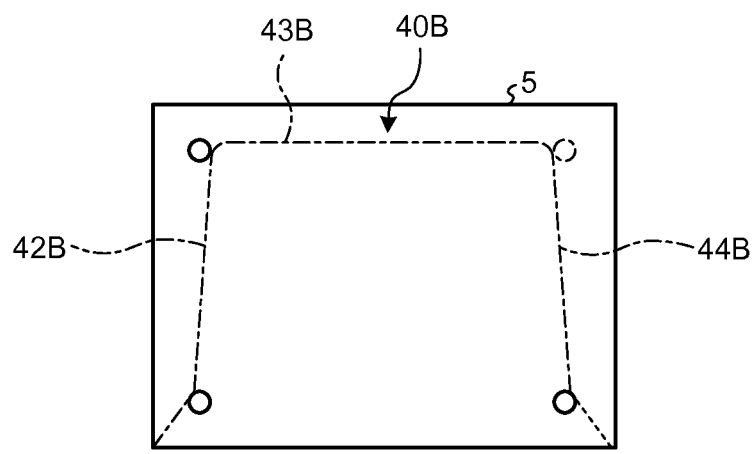
FIG. 16 is a diagram illustrating a movement route and a movement command that are set in a workpiece having a second plate thickness.
Figure 17:
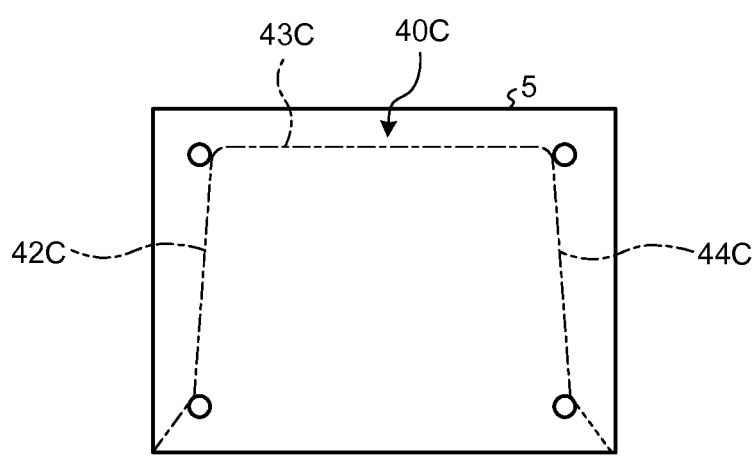
FIG. 17 is a diagram illustrating a movement route and a movement command that are set in a workpiece having a third plate thickness.

FIG. 15 is a diagram illustrating a movement route and a movement command that are set in the workpiece having a first thickness. FIG. 16 is a diagram illustrating the movement route and the movement command that are set in the workpiece having a second thickness. FIG. 17 is a diagram illustrating the movement route and the movement command that are set in the workpiece having a third plate thicknesses.

The shape after machining of the workpiece 5 illustrated in FIGS. 15 to 17 are the same as the shape after machining of the workpiece 5 illustrated in FIGS. 10 and 11. When the workpiece 5 has a first thickness (for example, 1 mm), in the movement route 40A, for example, G01 is set in the first inter-point route 42A (without shaft stop), G00 is set in the second inter-point route 43A and G01 is set in the third inter-point route 44A.

When the workpiece 5 has a second thickness (for example, 1.5 mm), in the movement route 40B, for example, G00 is set in the first inter-point route 42B, G00 is set in the second inter-point route 43B and G00 is set in the third inter-point route 44B.

When the workpiece 5 has a third thickness (for example, 2 mm), in the movement route 40C, for example, G00 is set in the first inter-point route 42C, G00 is set in the second inter-point route 43C and G00 is set in the third inter-point route 44C.

Next, a comparison result between the machining time when the rapid traverse command (G00) is combined with the linear interpolation movement command (G01) and the machining time when the linear interpolation movement command (G01) is used will be described.

Figure 18:
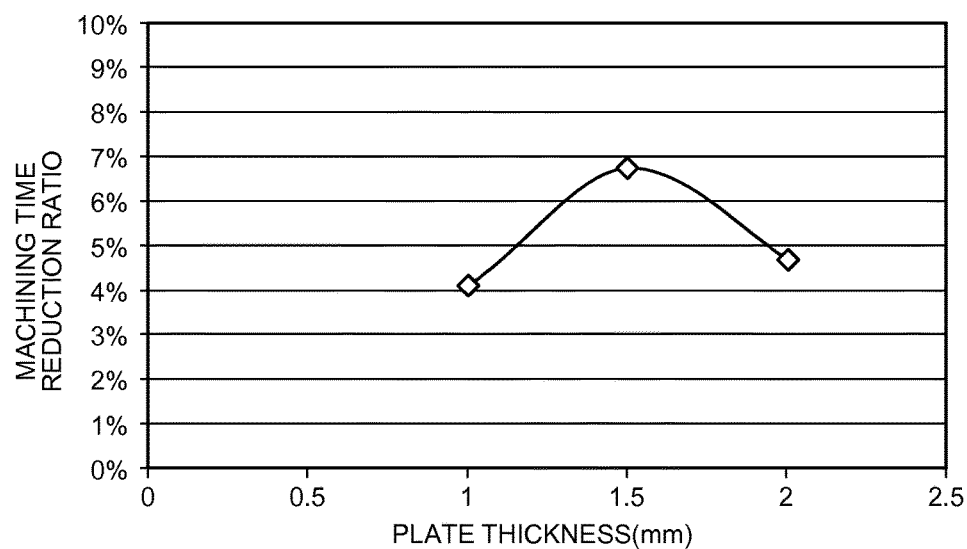
FIG. 18 is a diagram illustrating the comparison result between the machining time when G00 is combined with G01 and the machining time when G01 is used.

FIG. 18 is a diagram illustrating a comparison result between the machining time when G00 is combined with G01 and the machining time when G01 is used. A horizontal shaft of the graph illustrated in FIG. 18 represents a plate thickness of the workpiece 5, and a vertical shaft represents a machining time reduction ratio. Here, the machining time reduction ratio represents how much the machining time when G00 is combined with G01 is shortened in comparison with the machining time when G01 is used.

When G00 is combined with G01 in a case where the plate thickness of the workpiece 5 is 1 mm, the laser machining is performed by the movement route and the movement command illustrated in FIG. 15. Also, when G00 is combined with G01 in a case where the plate thickness of the workpiece 5 is 1.5 mm, the laser machining is performed by the movement route and the movement command illustrated in FIG. 16. Also, when G00 is combined with G01 in a case where the plate thickness of the workpiece 5 is 2 mm, the laser machining is performed by the movement route and the movement command illustrated in FIG. 17.

For example, when the plate thickness of the workpiece 5 is 1.5 mm, the machining time when G00 is combined with G01 is shortened by about 7% in comparison with the machining time when G01 is used without using G00.

Figure 19:
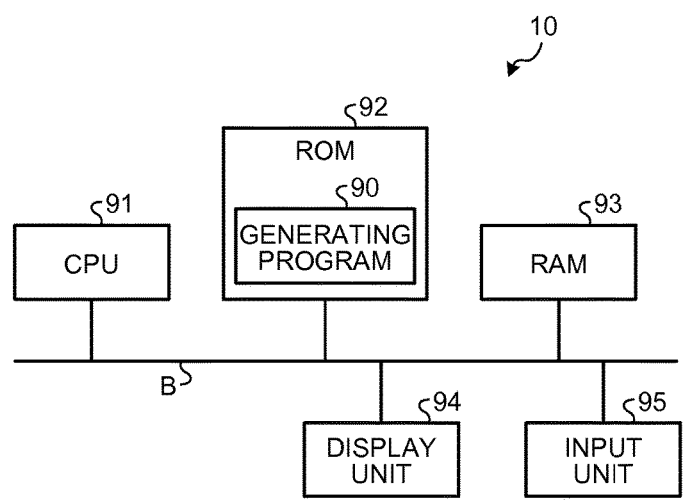
FIG. 19 is a diagram illustrating a hardware configuration of the NC program generating device.

FIG. 19 is a diagram illustrating a hardware configuration of the NC program generating device. The NC program generating device 10 has a CPU (Central Processing Unit) 91, a ROM (Read Only Memory) 92, a RAM (Random Access Memory) 93, a display unit 94 and an input unit 95. In the NC program generating device 10, the CPU 91, the ROM 92, the RAM 93, the display unit 94 and the input unit 95 are mutually connected via a bus line B.

The CPU 91 generates an NC program using the generating program (NC program generating program) 90 as a computer program. The display unit 94 is a display device such as a liquid crystal monitor, and displays the CAD data, the machining conditions, the machining device information, the movement route, the movement distance, the movement time, the selected movement method, the NC program and the like, in accordance with the instruction from the CPU 91.

The input unit 95 is configured to include a mouse and a keyboard, and inputs the instruction information (such as a parameter required to generate the NC program) that is externally input from a user. The instruction information that is input to the input unit 95 is sent to the CPU 91.

The generating program 90 is stored in the ROM 92, and is loaded to the RAM 93 via the bus line B. The CPU 91 executes the generating program 90 loaded into the RAM 93. Specifically, in the NC program generating device 10, in accordance with the instruction input from the input unit 95 of the user, the CPU 91 reads the generating program 90 from the inside of the ROM 92 and develops the program in the program storage area of the RAM 93 to execute the various processes. The CPU 91 temporarily stores various data generated during the various processes in the data storage area formed in the RAM 93.

The generating program 90 executed by the NC program generating device 10 has a module configuration that includes the movement time calculation unit 19, the movement method selection unit 21 and the NC program generating unit 22, and these modules are loaded onto the main storage device and are generated on the main memory. In addition, the generating program 90 may have at least one function of the movement route setting unit 17 and the movement distance calculation unit 18.

Since the machining head 24 is moved by combining the rapid traverse command (G00) with the linear interpolation movement command (G01), it is possible to perform the laser machining in the shortest time. Also, it is possible to improve the productivity, while preventing the contact between the machining head 24 and an end material (member after machining) of the workpiece 5.

In this embodiment, although G00 or G01 is selected on the basis of the movement time of the machining head 24, G00 or G01 may be selected on the basis of the movement distance of the machining head 24.

As long as the machining device information and the machining conditions are determined in advance, the movement distance as 'the maximum-speed movement time=the command-speed movement time' is uniquely determined. Also, when the movement distance is long, although the time of the shaft stop of the machining head 24 and the time of the vertical movement of the machining head 24 are required as compared to G01, G00 having the fast movement speed can be moved in a shorter time than G01. Meanwhile, when the movement distance is short, G01 that has a lower movement speed than G00 but does not require the time of shaft stop of the machining head 24 and the time of vertical movement of the machining head 24 can be moved in a shorter time than G00. That is, when the movement distance of 'the maximum-speed movement time=the command-speed movement time' is set as L0, G00 is selected if the movement distance is longer than L0 when the movement distance is compared with L0, and G01 is selected if the movement distance is shorter than L0. Thus, it is possible to move the machining head in a short time. When the movement distance of the machining head 24 is larger than a predetermined threshold, G00 is selected, and when the movement distance is equal to or less than a predetermined threshold value, G01 is selected.

In this embodiment, the description has been given to a case where the movement speed of the machining head 24 is the same as the case of the beam ON and during the beam OFF of the laser beam 20. However, the movement speed (the movement speed during the laser machining) of the machining head 24 during the beam ON may be different from the movement speed (the movement speed when moving between the machining points) of the machining head 24 during the beam OFF. In this case, G00 or G01 is selected using the movement speed of the machining head 24 during the beam OFF. For example, the movement speed of the machining head 24 during the tracing control is set in advance, and G00 or G01 is selected on the basis of the movement speed of the machining head 24 during the tracing control.

Thus, according to the embodiment, since G00 or G01 is selected in the movement route of the machining head 24 so that the movement time of the machining head 24 is shortened, it is possible to easily generate the NC program capable of performing the laser machining in a short time, while preventing the machining defects.

Also, since the movement route when G00 is used and the movement route when G01 is used are separately set, it is possible to accurately set the movement route. Therefore, it is possible to accurately calculate the maximum-speed movement time when G00 is used, and the command-speed movement time when G01 is used.

Further, since the movement route is set on the basis of at least one of the plate thickness of the workpiece 5, the type of material, the movement speed set in G00 and the acceleration, and the machining shape of the workpiece 5, it is possible to accurately calculate the movement route when G00 is used.

Further, since the movement route is set on the basis of at least one of the plate thickness of the workpiece 5, the type of material, the movement speed set in G01 and the acceleration, and the machining shape of the workpiece 5, it is possible to accurately calculate the movement route when G01 is used.

Since G00 or G01 is selected when the movement route does not enter the machined area (the case in which the route using G00 can be set between the machining points), it is possible to easily generate the NC program.

Furthermore, by setting the machining head 24 at the different movement speeds during the beam ON and during the beam OFF, it is possible to set a predetermined movement speed that does not depend on the types of the plate thickness or the material of the workpiece 5.

Further, since G00/G01 can be selected merely by comparing the movement distance with a predetermined threshold value (L0), the movement time calculation unit 19 is not required, and it is made possible to generate an NC program by a simple configuration.

INDUSTRIAL APPLICABILITY

As described above, the NC program generating device, the NC program generating method and the NC program generating program according to the present invention are suitable for the generation of the NC program used in the laser machining.

REFERENCE SIGNS LIST

1 LASER MACHINING DEVICE
2 LASER BEAM IRRADIATION UNIT
4 MACHINING CONTROL DEVICE
5 WORKPIECE
10 NC PROGRAM GENERATING DEVICE
11 CAD DATA INPUT UNIT
12 MACHINING CONDITION INPUT UNIT
13 MACHINING DEVICE INFORMATION INPUT UNIT
14 CAD DATA STORAGE UNIT
15 MACHINING CONDITION STORAGE UNIT
16 MACHINING DEVICE INFORMATION STORAGE UNIT
17 MOVEMENT ROUTE SETTING UNIT
18 MOVEMENT DISTANCE CALCULATION UNIT
19 MOVEMENT TIME CALCULATION UNIT
20 LASER BEAM
21 MOVEMENT METHOD SELECTION UNIT
22 NC PROGRAM GENERATING UNIT
23 OUTPUT UNIT
24 machining head
40A to 40C, 40X, 50X MOVEMENT ROUTE 42A to 42C, 42X, 43A to 43C, 43X, 44A to 44C, 44X INTER-POINT ROUTE
51, 52 NC PROGRAM
71, 72 COMPONENT
310 MACHINING END POINT
320 MACHINING START POINT

The invention claimed is:

1. A numerical control (NC) program generating device configured to generate an NC program used in laser machining, using a rapid traverse command and a linear interpolation movement command, the rapid traverse command moving a relative position between a machining head and a workpiece at a first movement speed by separating the machining head and the workpiece such that a distance between the separated machining head and the workpiece is greater than a distance during the laser machining, and the linear interpolation movement command moving the relative position at a second movement speed lower than the first movement speed such that a distance between the machining head and the workpiece is equal to the distance during the laser machining, while causing the machining head to trace the workpiece, the device comprising:
 a movement time calculation unit configured to calculate a first movement time required when the relative position moves between machining points from a machining end point to a next machining start point in the case of using the rapid traverse command on the basis of a movement route of the machining head and the first movement speed when performing laser machining of the workpiece, and to calculate a second movement time required when the relative position moves between the machining points in the case of using the linear interpolation command on the basis of the movement route and the second movement speed;
 a movement method selection unit to select, from among the rapid traverse command and the linear interpolation command, a movement command corresponding to the shorter one of the first movement time and the second movement time, as a movement command between the machining points;
 an NC program generating unit configured to generate the NC program by setting the selected rapid traverse command or the linear interpolation movement command between the machining points; and
 a machining condition storage unit configured to store values of the first movement speed and the second movement speed, the values varying based on a plate thickness of the workpiece,
 wherein the movement method selection unit is configured to select the rapid traverse command or the linear interpolation command based on the stored values.

2. The NC program generating device according to claim 1, further comprising:
 a movement route setting unit configured to set the movement route between each of the machining points on the basis of a target machining shape after the laser machining of the workpiece.

3. The NC program generating device according to claim 2, wherein the movement route setting unit is configured to set, between the machining points, a first movement route in the case of using the rapid traverse command, and a second movement route in the case of using the linear interpolation movement command, and
 the movement time calculation unit is configured to calculate the first movement time on the basis of the first movement route and the first movement speed, and to calculate the second movement time on the basis of the second movement route and the second movement speed.

4. The NC program generating device according to claim 3, wherein the movement route setting unit is configured to set the first movement route, on the basis of at least one of the plate thickness of the workpiece, a material of the workpiece, the first movement speed and a relative acceleration between the machining head set in the rapid traverse command and the workpiece, and the target machining shape.

5. The NC program generating device according to claim 3, wherein the movement route setting unit is configured to set the second movement route, on the basis of at least one of the plate thickness of the workpiece, a material of the workpiece, the second movement speed and a relative acceleration between the machining head set in the linear interpolation movement command and the workpiece, and the target machining shape.

6. The NC program generating device according to claim 2, wherein,
 in response to the movement route setting unit determining that it is possible to set a route using the linear interpolation movement command between the machining points, the movement route setting unit sets a first movement route in the case of using the rapid traverse command and a second movement route in the case of using the linear interpolation movement command between the machining points, and the movement route setting unit calculates the first movement time on the basis of the first movement route and the first movement speed, and calculates the second movement time on the basis of the second movement route and the second movement speed, and
 in response to the movement route setting unit determining that it is not possible to set a route using the linear interpolation movement command between the machining points, the movement route setting unit sets the first movement route between the machining points, and the movement method selection unit selects the rapid traverse command as a movement command between the machining points.

7. The NC program generating device according to claim 1, wherein the second movement speed is different from a relative movement speed between the machining head and the workpiece when performing the laser machining of the workpiece.

8. The NC program generating device according to claim 1, wherein the rapid traverse command is a G00 command, and
 the linear interpolation movement command is a G01 command.

9. The NC program generating device according to claim 2, wherein shape data of the target machining shape is computer aided data (CAD), and
 the NC program is generated using computer aided manufacturing (CAM).

10. A method for generating a numerical control (NC) program that generates an NC program used in laser machining, using a rapid traverse command and a linear interpolation movement command, the rapid traverse command moving a relative position between a machining head and a workpiece at a first movement speed by separating the machining head and the workpiece such that a distance between the machining head and the workpiece is greater than a distance during the laser machining, and the linear interpolation movement command moving the relative position at a second movement speed lower than the first movement speed such that a distance between the machining head and the workpiece is equal to the distance during the laser machining, while causing the machining head to trace the workpiece, the method comprising:

calculating a first movement time required when the relative position moves between machining points from a machining end point to a next machining start point in the case of using the rapid traverse command on the basis of a movement route of the machining head and the first movement speed when performing laser machining of the workpiece, and calculating a second movement time required when the relative position moves between the machining points in the case of using the linear interpolation command on the basis of the movement route and the second movement speed;

selecting, from among the rapid traverse command and the linear interpolation command, a movement command corresponding to the shorter one of the first movement time and the second movement time, as a movement command between the machining points; and generating the NC program by setting the selected rapid traverse command or the linear interpolation movement command between the machining points, wherein the method further comprises:

storing values of the first movement speed and the second movement speed, the values varying based on a plate thickness of the workpiece; and selecting the rapid traverse command or the linear interpolation command based on the stored values.

11. The method for generating an NC program according to claim 10, wherein the rapid traverse command or the linear interpolation movement command is set for each machining point, and both the rapid traverse command and the linear interpolation movement command are included in the movement command for moving the relative position from an initial machining end point to a last machining start point, in the movement route set in the NC program.

* * * * *